US011422597B2

(12) United States Patent
Marz et al.

(10) Patent No.: US 11,422,597 B2
(45) Date of Patent: Aug. 23, 2022

(54) PREDETERMINING SEPARATE THERMAL CONTROL POINTS FOR CHIPS OF A MULTI-CHIP MODULE

(71) Applicant: INTERNATIONAL BUSINESS MACHINES CORPORATION, Armonk, NY (US)

(72) Inventors: Eric Marz, Williston, VT (US); Kirk D. Peterson, Jericho, VT (US); Greg Abrami, Essex Junction, VT (US); Howard V. Mahaney, Jr., Cedar Park, TX (US); William James Anderl, Rochester, MN (US); Eric Jason Fluhr, Round Rock, TX (US); Todd Jon Rosedahl, Zumbrota, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 3 days.

(21) Appl. No.: 17/142,658

(22) Filed: Jan. 6, 2021

(65) Prior Publication Data

US 2022/0214728 A1    Jul. 7, 2022

(51) Int. Cl.
*G06F 1/20* (2006.01)
*G05B 17/02* (2006.01)
*G06F 1/324* (2019.01)

(52) U.S. Cl.
CPC ............. *G06F 1/206* (2013.01); *G05B 17/02* (2013.01); *G06F 1/324* (2013.01)

(58) Field of Classification Search
CPC ..................................................... G06F 1/206

(Continued)

(56) References Cited

U.S. PATENT DOCUMENTS 6,767,766 B2   7/2004  Chu et al.
6,968,709 B2  11/2005  Goth et al.
(Continued)

FOREIGN PATENT DOCUMENTS

CN   106970689 B    7/2018
JP   H09-153566 A   6/1997
JP   H09-3246199 B2 1/2002

OTHER PUBLICATIONS

Mel et al., "The NIST Definition of Cloud Computing," National Institute of Standards and Technology, Information Technology Laboratory, Special Publication 800-145, Sep. 2011 (pp. 1-7).

*Primary Examiner* — Suresh Suryawanshi
(74) *Attorney, Agent, or Firm* — Tihon Poltavets, Esq.; Kevin P. Radigan, Esq.; Heslin Rothenberg Farley & Mesiti P.C.

(57) ABSTRACT

Thermal control of a multi-chip module in an operating environment is facilitated by predetermining separate thermal control points for multiple chips of the multi-chip module, with a first chip and a second chip having different predetermined thermal control points, and saving the predetermined thermal control points for reference by a thermal control of the multi-chip module in an operating environment. The thermal control monitors an operating temperature of the first chip, and compares the operating temperature of the first chip to the predetermined thermal control point of that chip. The thermal control further initiates a control action to control temperature of the first chip based on comparing the operating temperature of the first chip to the predetermined thermal control point of the first chip.

20 Claims, 12 Drawing Sheets

(58) Field of Classification Search
USPC .......................................................... 700/300
See application file for complete search history.

(56) References Cited

U.S. PATENT DOCUMENTS

| | | | |
|---|---|---|---|
| 7,327,569 | B2 | 2/2008 | Belady et al. |
| 7,454,631 | B1 * | 11/2008 | Laudon ................. G06F 1/3243 713/320 |
| 8,513,696 | B2 | 8/2013 | Tu et al. |
| 9,778,726 | B2 | 10/2017 | Allen-Ware et al. |
| 9,952,651 | B2 | 4/2018 | Allen-Ware et al. |
| 10,409,358 | B1 | 9/2019 | Yaddanapudi et al. |
| 2005/0127500 | A1 | 6/2005 | Colgan et al. |
| 2006/0133040 | A1 | 6/2006 | Belady et al. |
| 2013/0076381 | A1 * | 3/2013 | Takayanagi ............ G01K 3/005 374/1 |
| 2016/0274629 | A1 * | 9/2016 | Lovicott ................. G06F 1/206 |
| 2017/0177044 | A1 * | 6/2017 | Limaye ................... G06F 1/324 |
| 2019/0384367 | A1 | 12/2019 | Jain et al. |

* cited by examiner

PREDETERMINING SEPARATE THERMAL CONTROL POINTS FOR CHIPS OF A MULTI-CHIP MODULE

BACKGROUND

A wide variety of computer systems, including electronic devices, include one or more multi-chip modules as part of the system. In a multi-chip module, multiple integrated circuits, semiconductor dies and/or other discrete components, are integrated onto or within a common substrate, with the resultant package being referred to as a multi-chip module. Multi-chip modules are available in a variety of forms, including prepackaged integrated circuits on a printed circuit board, to fully-custom chip packages integrating many chip dies on a high-density interconnection (HDI) substrate.

Trends in computer system operation continue to place increasing performance demands on the system. One way to increase performance of a system is to increase allowed power consumption of components, such as processors within the system. However, increased power consumption can cause thermal increases within the system, which can result in a throttling of performance of the computer system in certain cases.

SUMMARY

Certain shortcomings of the prior art are overcome and additional advantages are provided through the provision, in one or more aspects, of a computer-implemented method, which includes predetermining separate thermal control points for multiple chips of a multi-chip module, where a first chip and a second chip of the multi-chip module have different predetermined thermal control points, and saving the predetermined thermal control points for reference by a thermal control of the multi-chip module in an operating environment. The thermal control is to monitor an operating temperature of the first chip of the multiple chips, compare the operating temperature of the first chip to the predetermined thermal control point of the first chip, and initiate a control action to control temperature of the first chip based on comparing the operating temperature of the first chip to the predetermined thermal control point of the first chip.

Systems and computer program products relating to one or more aspects are also described and claimed herein. Further, services relating to one or more aspects are also described and can be claimed herein.

Additional features and advantages are realized through the techniques described herein. Other embodiments and aspects of the invention are described in detail herein and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1A:
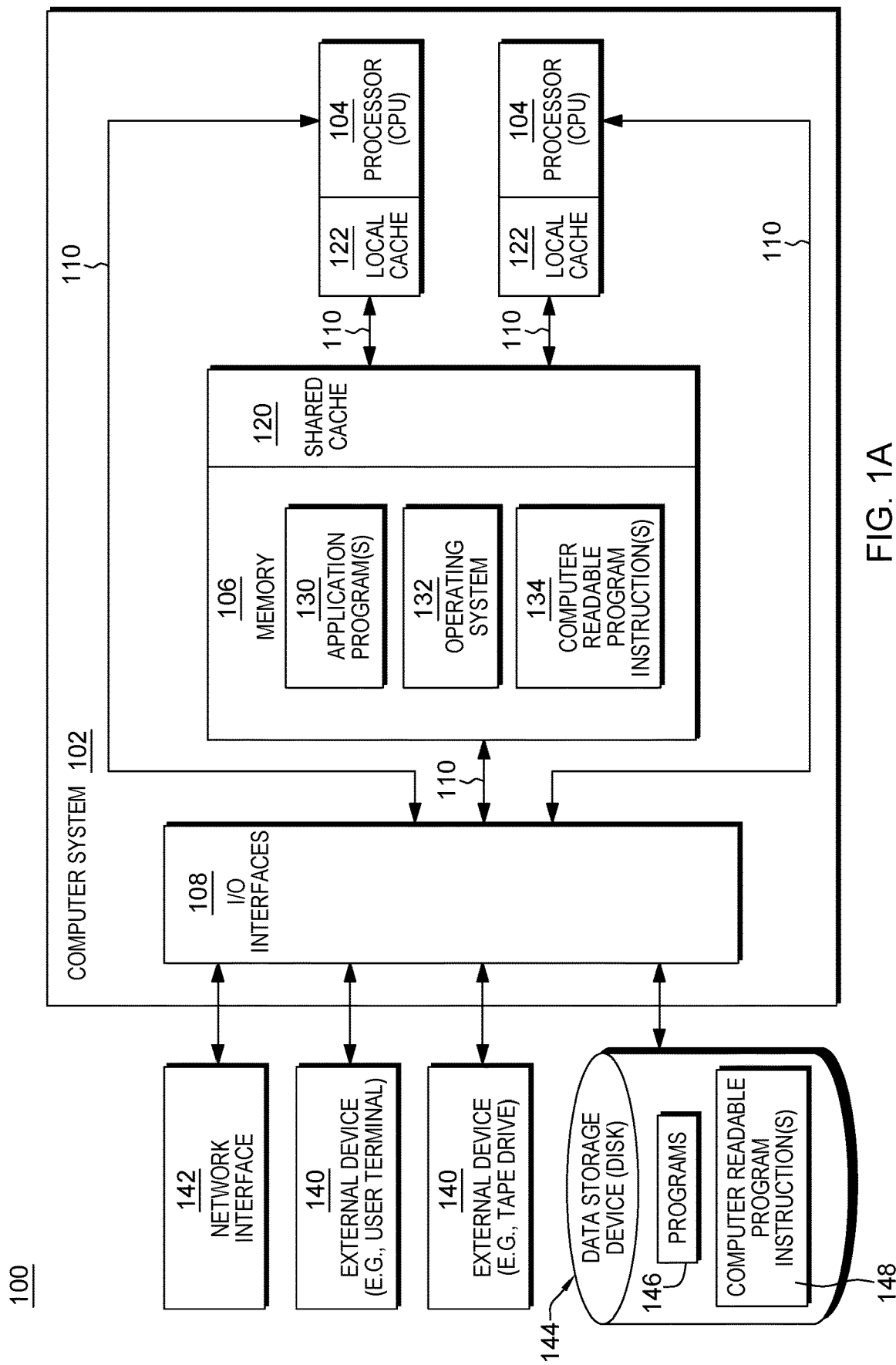
FIG. 1A depicts a block diagram of one embodiment of a computer system which can implement processing, in accordance with one or more aspects of the present invention.

The accompanying figures, in which like reference numerals refer to identical or functionally similar elements throughout the separate views, and which are incorporated in and form a part of the specification, further illustrate the present invention and, together with the detailed description of the invention, serve to explain aspects of the present invention. Note in this regard that descriptions of well-known systems, devices, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

Note also that illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code, as referred to in this application, can include both software and hardware. For example, program code in certain embodiments of the present invention can include fixed function hardware, while other embodiments can utilize a software-based implementation of the functionality described. Certain embodiments combine both types of program code. One example of program code, also referred to as one or more programs, is depicted in FIG. 1A as computer-readable program instructions 134, as well as application programs 130, one or more of which can be stored in memory 106 of computer system 102. Further examples include programs 146 and computer-readable program instruction(s) 148 in data storage device 144 of FIG. 1A.

With reference to the figures, and in particular with reference to FIG. 1A, an example diagram is shown of a data processing environment in which one or more aspects of illustrative embodiments can be implemented. FIG. 1A is only an example and is not intended to assert or imply any limitation with regard to the environments in which different embodiments can be implemented. A particular implementation can have many modifications to the depicted environment.

With reference to FIG. 1A, as noted this figure depicts a block diagram of a data processing system 100 in which one or more aspects of the present invention can be implemented. Data processing system 100 is an example of a computer, such as server, or other type of electronic device, in which computer usable program code or instructions implementing one or more processes can be located for the illustrative embodiments.

As shown in FIG. 1A, data processing system 100 includes, for instance, a computer system 102 shown, e.g., in the form of a general-purpose computing device. Computer system 102 can include, but is not limited to, one or more processors or processing units 104 (e.g., central processing units (CPUs)), a memory 106 (referred to as main memory or storage, as examples), and one or more input/output (I/O) interfaces 108, coupled to one another via one or more buses and/or other connections 110.

Processor 104 includes a plurality of functional components used to execute instructions. These functional components include, for instance, an instruction fetch component to fetch instructions to be executed; an instruction decode unit to decode the fetched instructions and to obtain operands of the decoded instructions; instruction execution components to execute the decoded instructions; a memory access component to access memory for instruction execution, if necessary; and a write back component to provide the results of the executed instructions.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI), as well as others.

Memory 106 can include, for instance, a cache 120, such as a shared cache, which may be coupled to local caches 122 of processors 104. Further, memory 106 can include one or more programs or applications 130, an operating system 132, and one or more computer readable program instructions 134. Computer-readable program instructions 134 can be configured to carry out one or more aspects of certain embodiments of the present invention.

Computer system 102 can also communicate via, e.g., I/O interfaces 108 with one or more external devices 140, one or more network interfaces 142, and/or one or more data storage devices 144. Example external devices include a user terminal, a tape drive, a pointing device, a display, etc. Network interface 142 enables computer system 102 to communicate with one or more networks, such as a local area network (LAN), a general wide area network (WAN), and/or a public network (e.g., the Internet), providing communication with other computing devices or systems.

Data storage device 144 can store one or more programs 146, one or more computer readable program instructions 148, and/or data, etc. The computer readable program instructions can be configured to carry out functions of one or more aspects of the present invention.

Computer system 102 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 can be operational with numerous other general purpose or special purpose computing system environments or configurations. Examples of well-known computing systems, environments, and/or configurations suitable for use with computer system 102 include, but are not limited to, personal computer (PC) systems, server computer systems, thin clients, thick clients, handheld or laptop electronic devices, smartphones, multiprocessor systems, microprocessor-based systems, set top boxes, programmable consumer electronics, network PCs, minicomputer systems, mainframe computer systems, and cloud computing environments that include any of the above systems or devices, and the like.

As noted, the depicted example of FIG. 1A is not meant to imply architectural limitations. Further, as noted, data processing system 100 of FIG. 1A could be, for instance, a server, workstation, tablet computer, laptop computer, electronic device or other computing device or system.

Figure 1B:
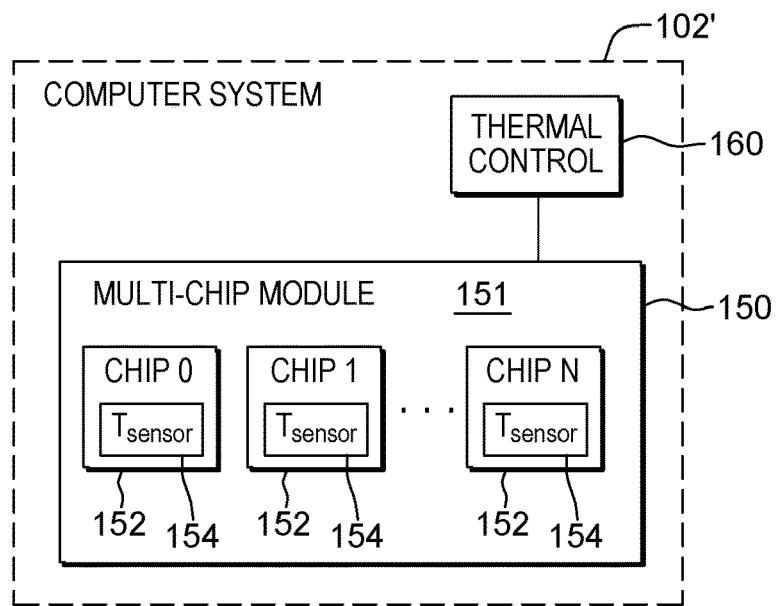
FIG. 1B is a further block diagram of a computer system including a multi-chip module with a plurality of chips and a thermal control which can implement processing, in accordance with one or more aspects of the present invention.

By way of further example, FIG. 1B depicts certain components of another embodiment of a computer system 102', such as computer system 102 described above in connection with FIG. 1A. As shown, the embodiment of FIG. 1B includes a multi-chip module 150, which has multiple chips 152. In one embodiment, the multiple chips are multiple integrated circuits, semiconductor dies and/or other discrete components integrated onto (or within) a common substrate, such as a common circuit board 151. In one implementation only, two or more of the multiple chips 152 can be identical chips of computer system 102', such as identical processor chips. In another embodiment, one or more of the multiple chips 152 can be chips of different design than one or more other chips of the multi-chip module, for instance, to perform different functions. As with computer system 102 described above, computer system 102' can be, for instance, a personal computer (PC) system, server computer system, thin client, thick client, handheld or laptop electronic device, smartphone, multiprocessor system, microprocessor-based system, set top box, programmable consumer electronic device, network PC, minicomputer system, mainframe computer system, as well as a cloud computing environment that includes any of the above systems or devices, and the like.

As noted, ever-increasing performance demands are being placed on computer systems today. One way to increase performance of a system is to increase allowed power consumption of the components, such as processors within the system. However, this increase in power can cause thermal increases within the system, which can disadvantageously result in a reduction or throttling of performance of the computer system. In one embodiment, such performance throttling can mean limiting the power and clock frequency to a chip to try to prevent the chip from rising above a set threshold temperature, or to try to maintain the temperature around the threshold temperature, for instance, around a reference temperature. Conventionally, if the power and clock frequency of a 'hot' running chip are not throttled, then the chip and system could overheat. Note that the term "throttle" in this context can include limiting the voltage, power and/or use of the chip or computer system to produce less heat than if the chip/system were not throttled.

Today, chips of a multi-chip module typically have a common thermal control point for cooling control and performance throttling. However, a multi-chip module will likely have two or more chips with mismatched power requirements, for instance, due to different chip designs, such as different core counts, and even where the chips have a common chip design, the chips can have mismatched power requirements due to material and/or fabrication process variations. The better the power and thermal relationships between chips of a multi-chip can be resolved, the more competitive frequency and power specifications can be offered for the multi-chip module.

As illustrated in FIG. 1B, in one implementation, chips 152 of multi-chip module 150 can have one or more temperature sensors 154 associated with the chip to monitor, or determine, one or more chip temperatures, and generate therefrom an operating temperature that can be compared against one or more temperature thresholds used by a thermal control 160. Thermal control 160 can be, or include, program code, such as firmware, associated with multi-chip module 150. In one or more implementations, thermal control 160 can be implemented within multi-chip module 150, or can be operatively coupled to multi-chip module 150, for instance, as part of an operational control of the computer system.

In one or more embodiments disclosed herein, thermal control 160 is a controller or control system which monitors or determines, in part, an operating temperature of each chip of the multi-chip module, compares the operating temperature of each chip to separate, predetermined thermal control points for the chips of the multi-chip module, and based on the comparison, initiates a control action to control temperature of one or more of the chips by, for instance, actively controlling system cooling to the multi-chip module, and/or where necessary, by performance throttling of one or more chips of the multi-chip module.

More particularly, disclosed herein are computer-implemented methods, computer systems and computer program products, where program code executing on one or more processors predetermines separate thermal control points for multiple chips of a multi-chip module, with a first chip and a second chip of the multiple chips having different predetermined thermal control points, and saves the predetermined thermal control points for reference by a thermal control of the multi-chip module in an operating environment, such as described herein. The thermal control monitors an operating temperature of a chip of the multi-chip modules, compares the operating temperature of that chip to the chip's predetermined thermal control point, and initiates a control action to control temperature of the chip based on comparing the operating temperature of the chip to the predetermined thermal control point of the chip. Note in this regard that the comparing can be direct or indirect. For instance, the monitored operating temperature can be compared to one or more chip-specific temperature thresholds derived with reference to the predetermined thermal control point for that chip. For example, in one embodiment, a first threshold may be XV cooler than the predetermined thermal control point temperature for the chip, with cooling being ramped up should the chip temperature reach or exceed the first threshold. Multiple other thresholds could be provided if desired with reference to the predetermined thermal control point temperature for the chip, to take one or more control actions, as appropriate for a particular multi-chip module and/or system design.

As explained herein, the separate thermal control points for the chips of a multi-chip module can be predetermined based on the power needs of each chip (e.g., in running a test workload) and the thermal solution of the multi-chip module and operating system environment. The predetermined thermal control points are predefined static control points used as a reference to control taking a control action, such as taking a cooling control action and/or a performance throttling action, for the chips of the multi-chip module. Advantageously, the predetermined control points are separate, fixed thermal control points that are determined for the different chips of a multi-chip module. These separate thermal control points advantageously allow for a range of different power and frequency chip operation across the multi-chip module. For instance, a chip can have a higher acceptable power operation and/or frequency operation by better resolving the power and/or thermal requirements of each chip of a multi-chip module. By more closely resolving the actual power and/or thermal requirements of each chip to, for instance, run a common workload, one or more of the chips of the multi-chip module can be allowed to operate with a higher power and a higher temperature control point, that is, where one or more other chips of the multi-chip module are ascertained to operate at or require a lower power and lower temperature control point. Thus, a range of predetermined thermal control points is ascertained across the chips of a multi-chip module, with thermal decisions being made for each chip based on that chip's respective predetermined thermal control point.

In certain embodiments, the predetermining of separate thermal control points for the multiple chips of a multi-chip module is performed during a testing phase of the multi-chip module, and the thermal control references the predetermined, saved thermal control points during an operating phase of the multi-chip module in the operating environment. As explained herein, testing environment data for the multiple chips of a multi-chip module can be used to determine the separate thermal control points for the multiple chips for the operating environment of the system. In one embodiment, the separate thermal control points are predetermined based on required power of each chip, for instance, in processing a test workload, and based on the thermal solution of the multi-chip module and the computer system. Specifying individual chip thermal control points can be based on current and voltage characterizations, and system thermal resistance, as explained further below. With this information, system cooling and performance is tuned through, for instance, the thermal control, such as a firmware control process, for each chip in the multi-chip module, based on that chip's predetermined, calibrated thermal control point.

Advantageously, the separate thermal control points, predetermined as described herein and saved for reference by the thermal control in the operating environment, can support a higher individual chip power/temperature in certain cases, which can advantageously result in a higher multi-chip module acceptance rate, yield or sort frequency.

Figure 2:
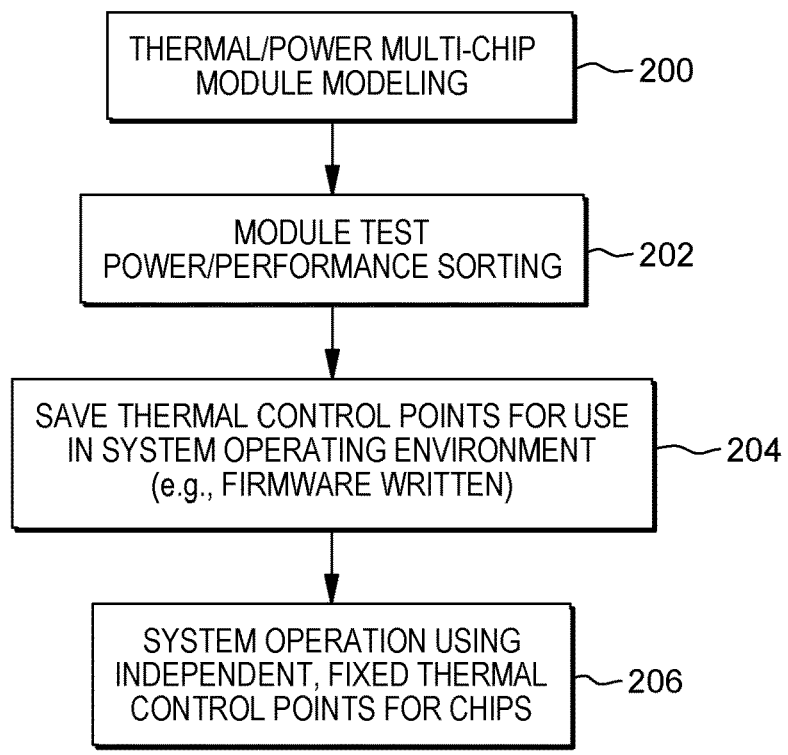
FIG. 2 depicts one embodiment of a process for predetermining separate thermal control points for chips of a multi-chip module, in accordance with one or more aspects of the present invention.

FIG. 2 depicts one embodiment of a process for predetermining separate thermal control points for chips of a multi-chip module. As illustrated, the process includes thermal and/or power multi-chip module modeling 200. This modeling can include defining power limits for a worst case: to manage system power, and maintain operating chip temperature at or below a control point temperature at nominal power. Advantageously, the process is also constructed to allow a range of thermal control points to be used across the chips of the multi-chip module, and to include that in design requirements for the chips. Further, module test processing is performed 202, which includes power and/or performance sorting of the chips, or more particularly, the multi-chip modules. This module test processing can include determining voltage and frequency behavior of each chip, as well as determining power at the chip voltage and frequency, as well as a chip control point temperature ($T_{Control}$) consistent with the test power. It is noted that the DC component of current in this process is a strong function of the chip's thermal control point temperature. The obtained voltage, frequency and current(s), along with the chip's determined thermal control point, are saved for each chip. Once obtained, the information is used to facilitate sorting of the multi-chip module. For instance, the sorting can be based on the separate thermal control points determined for the chips of the module. Assuming that the multi-chip module passes testing and sorting, then the predetermined, separate thermal control points for the chips of the multi-chip module are saved, for instance, written to firmware, for reference by the thermal control in the operating environment, that is, to allow (for instance) control of the cooling to the multi-chip module based on a comparison of each chip's operating temperature relative to its respective predetermined thermal control point 204. The multi-chip module is thus operating in the operating environment using the different, fixed, thermal control points for the chips determined in the testing environment.

Figure 3:
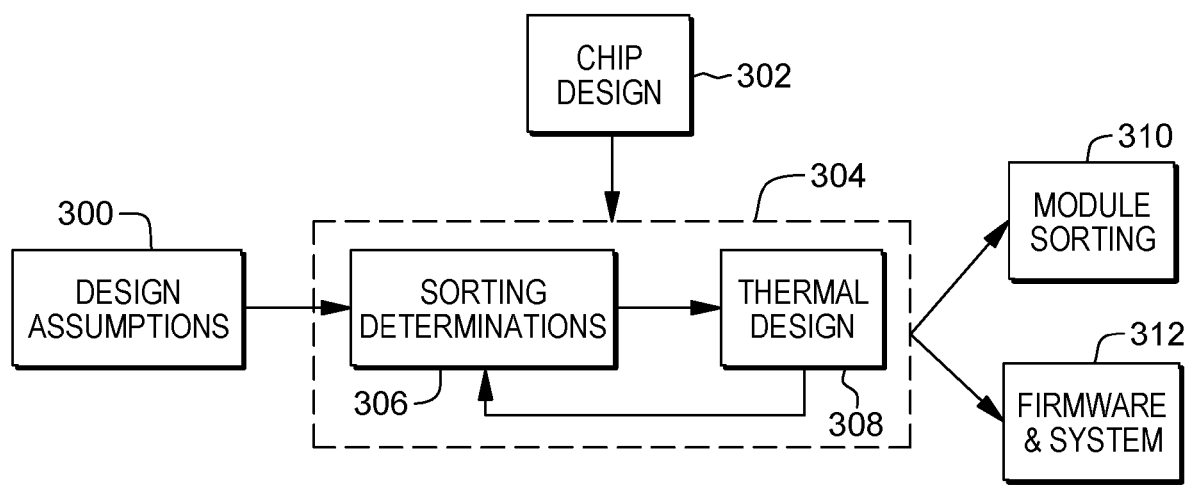
FIG. 3 depicts one embodiment of thermal/power multi-chip module model processing, in accordance with one or more aspects of the present invention.

FIG. 3 depicts one embodiment of thermal/power multi-chip module model processing, in accordance with one or more aspects of the present invention. In one or more implementations, this processing is performed, in part, in association with a testing phase of the multi-chip module. Multi-chip module design assumptions 300 and chip design data 302 are provided to the process which makes sorting determinations 306 based, in part, on the thermal design 308 for the chips and multi-chip module during, for instance, a testing phase 304 of the multi-chip module. Based on the information obtained, module sorting 310 is performed, for instance, to determine whether there is a pass or fail of a given multi-chip module, with passing multi-chip modules having the test data, including the predetermined thermal control points for the respective chips of the multi-chip module saved, for instance, to firmware of a computer system 312 for subsequent access by a thermal control of the system. Note that the determined power limits in the design assumptions implies a power distribution for the chips, and a reference design temperature for the chips can be used to determine a control point distribution about the reference temperature. For instance, if the reference temperature in the design materials is 85° C., then a distribution for acceptable control points might be, for instance, 80° C.-90° C., which allows one or more chips to have a control point temperature above 85° C., provided one or more chips have a control point temperature below 85° C.

Figure 4:
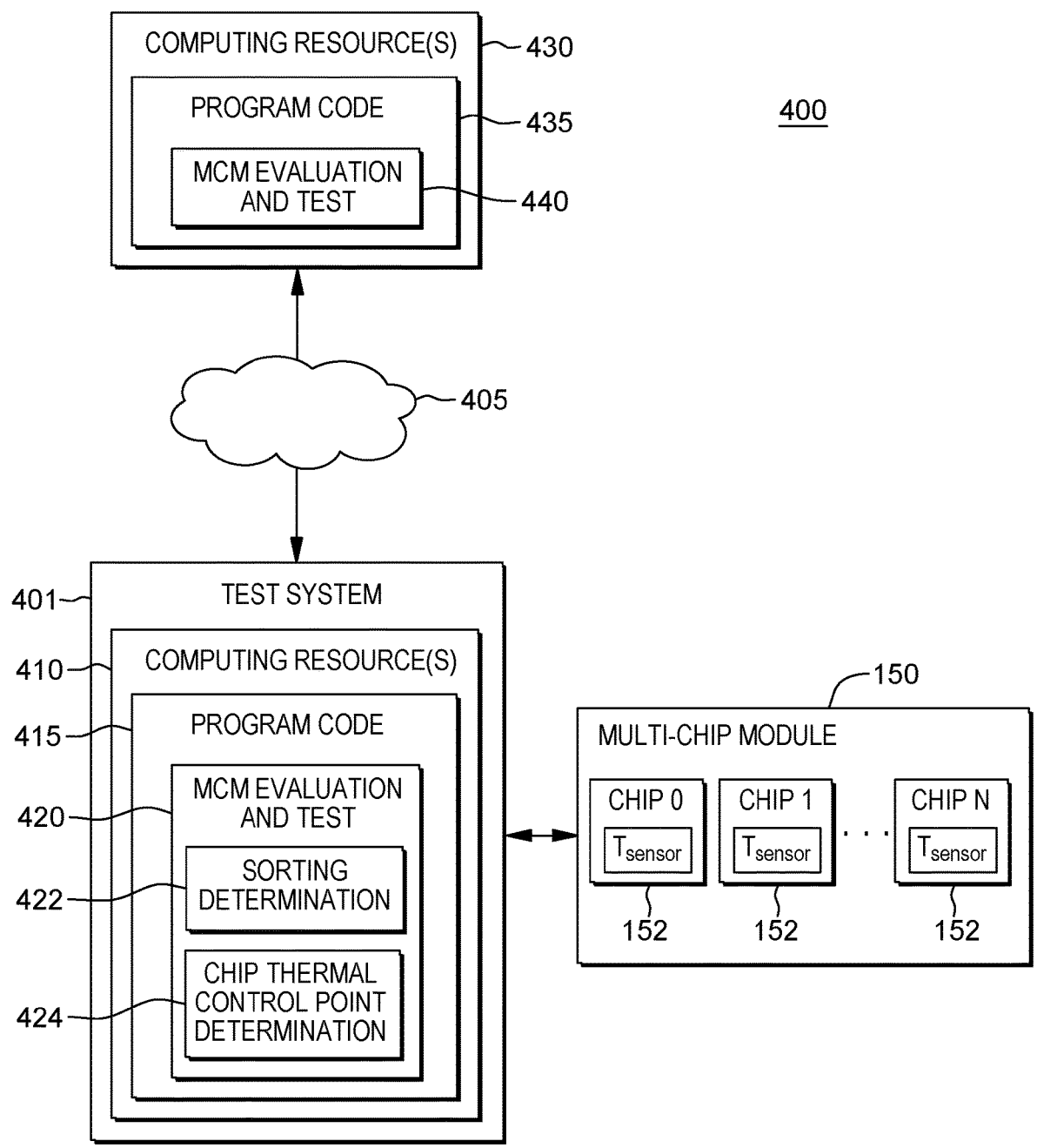
FIG. 4 depicts one embodiment of a computing environment which includes a multi-chip module test system facilitating power/performance testing and sorting of chips/modules, in accordance with one or more aspects of the present invention.

FIG. 4 depicts one embodiment of a computing environment, generally denoted 400, which includes a multi-chip module test system 401 for facilitating power and/or performance testing and sorting of chips/multi-chip modules, such as multi-chip module 150 described above in connection with FIG. 1B. By way of example, various computing devices can be provided or used, including one or more computing resources 410 within or associated with multi-chip module test system 401, as well as one or more remote computing resources 430, with which multi-chip module test system 401 is communication across, for instance, one or more networks 405. As illustrated in FIG. 4, computing resource(s) 410 executes program code 415 that performs multi-chip module evaluation and test 420, including program code to facilitate sorting determination of chips and multi-chip modules 422, as well as chip thermal control point determination 424, such as described herein. In certain implementations, computing resource(s) 430 can be one or more computing resources remote from multi-chip module test system 401, such as one or more computing resources of a cloud hosting environment. Computing resource(s) 430 can include program code 435 executing on one or more processors to facilitate one or more aspects of multi-chip module evaluation and test 440, such as described herein.

Network 405 can be, for instance, a telecommunications network, a local-area network (LAN), a wide-area network (WAN), such as the Internet, or a combination thereof, and can include wired, wireless, fiber-optic connections, etc. The network(s) 405 can include one or more wired and/or wireless networks that are capable of receiving and transmitting data, including data associated with multi-chip module evaluation and testing, such as described herein.

In one or more implementations, computing resource(s) 410, and/or computing resource(s) 430 houses and/or executes program code configured to perform methods in accordance with one or more aspects of the present invention. By way of example, computing resource(s) 410 of multi-chip module test system 401, as well as computing resource(s) 430, can be a server or other computing-system-implemented resource(s) that is, in one or more embodiments, configured to perform one or more process aspects disclosed herein. Note that for illustrative purposes only, computing resource(s) 430 in FIG. 4 is depicted as being separate from multi-chip module test system 401 and computing resource(s) 410. This is a non-limiting example of an implementation. In one or more other implementations, computing resource(s) 410 within or associated with multi-chip module test system 401 can implement all of the processing disclosed herein.

Briefly described, in one embodiment, computing resource(s) 410 and/or computing resource(s) 430 can include one or more processors, for instance, central processing units (CPUs). Also, the processor(s) can include functional components used in the integration of program code, such as functional components to fetch program code from locations such as cache or main memory, decode program code, execute program code, access memory for instruction execution, and write results of the executed instructions or code. The processor(s) can also include a register(s) to be used by one or more of the functional components. In one or more embodiments, the computing resource(s) can include memory, input/output, a network interface, and storage, which can include and/or access one or more other computing resources and/or databases as required to implement the multi-chip module processing described herein. The components of the respective computing resource(s) can be coupled to each other via one or more buses and/or other connections. Bus connections can be one or more of any of several types of bus structures, including a memory bus or a memory controller, a peripheral bus, an accelerated graphics port, and a processor or local bus, using any of a variety of architectures. By way of example, and not limitation, such architectures can include the in Industry Standard Architecture (ISA), the Micro-Channel Architecture (MCA), the Enhanced ISA (EISA), the Video Electronic Standard Association (VESA), local bus, and Peripheral Component Interconnect (PCI). Examples of a computing resource(s) or a computer system(s) which can implement one or more aspects disclosed herein are described further with reference to FIGS. 1A & 8-9. Note also that, depending on the implementation, one or more aspects of each computing resource 410, 430, can be associated with, licensed by, subscribed to by, etc., a company or organization operating, owning, using, etc., the multi-chip module test system, and the processes disclosed herein.

Figure 5A:
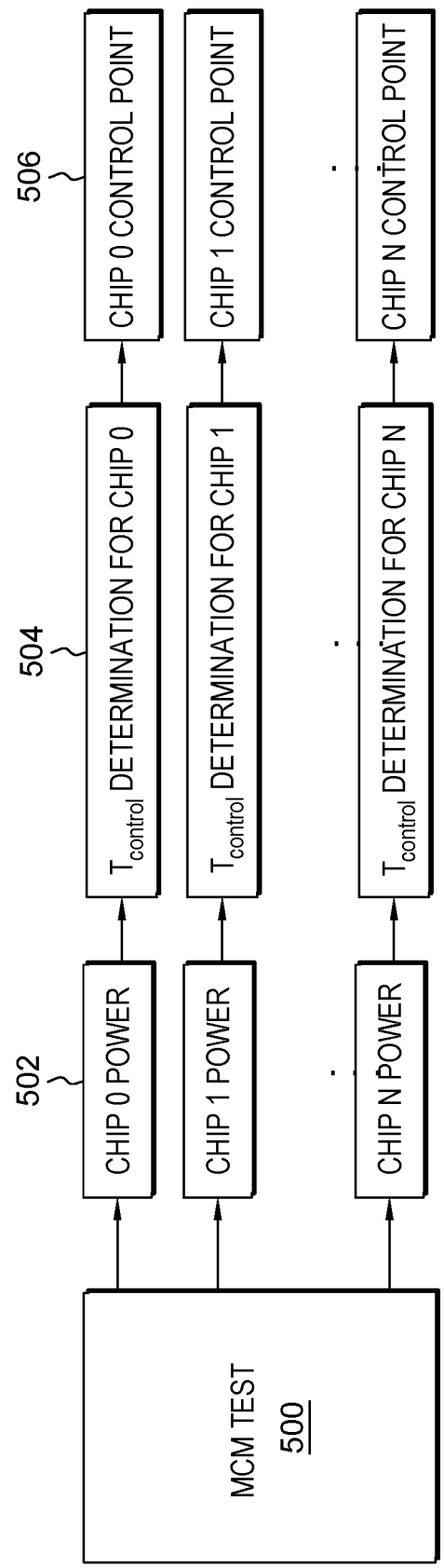
FIG. 5A depicts one embodiment of multi-chip module test processing to determine separate thermal control points for chips of the multi-chip module, in accordance with one or more aspects of the present invention.

FIG. 5A depicts one embodiment of the multi-chip module test processing, where the multi-chip module test 500 evaluates power of each chip 502, such as power used by each chip in the processing of a test workload, and determines, at least in part therefrom, a thermal control point ($T_{Control}$) for each chip 504 of the multi-chip module. The multi-chip module test processing provides the separate thermal control points 506 for saving and subsequent reference in the operating environment of a system containing, or using, the multi-chip module. Described herein is processing to specify individual chip thermal control points based, for instance, on multi-chip module current and voltage characterizations during the test phase, as well as based on system thermal resistance, as explained below.

Figure 5B:
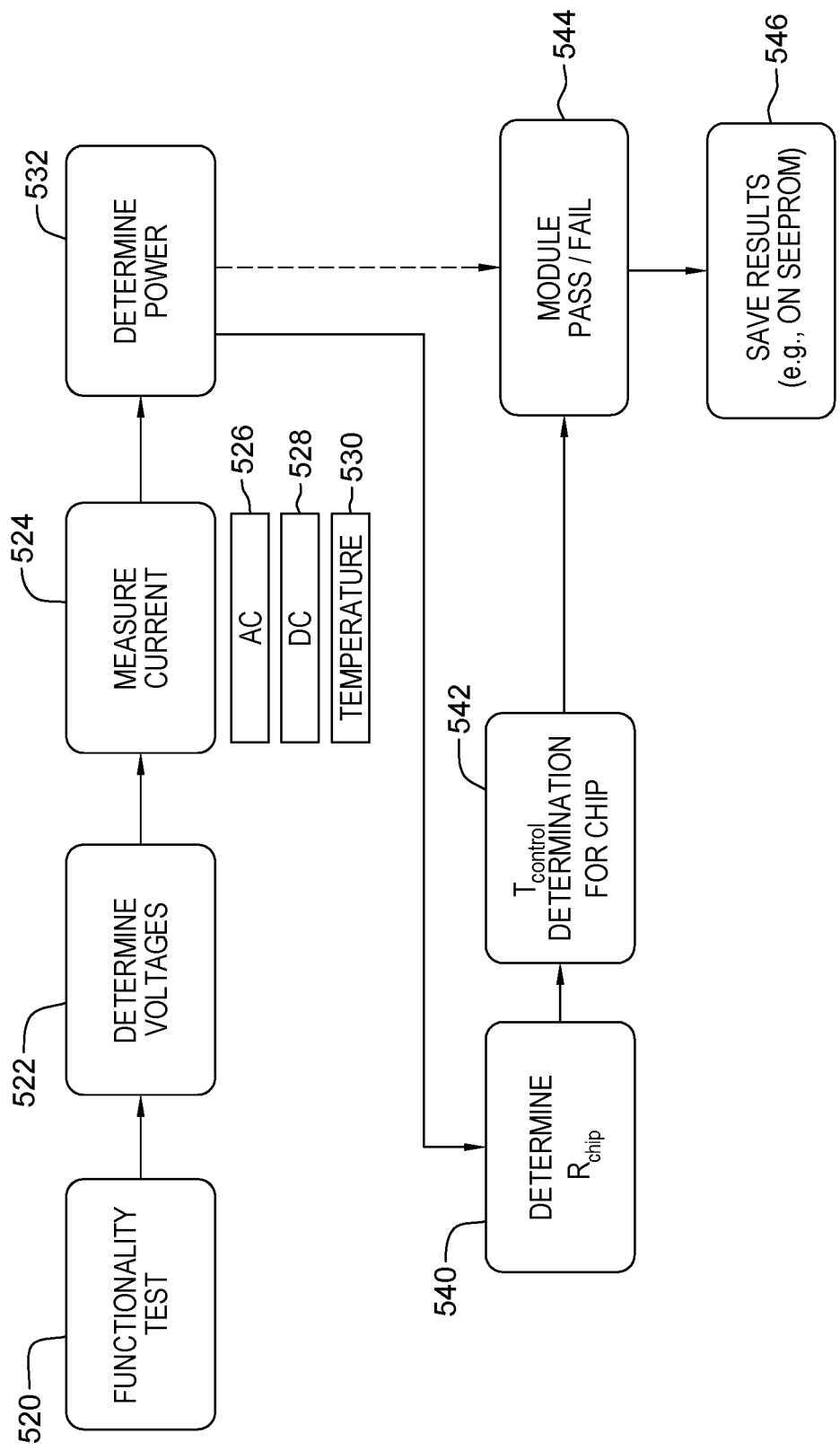
FIG. 5B depicts a further embodiment of multi-chip module test processing, with separate thermal control point determination, in accordance with one or more aspects of the present invention.

By way of example, FIG. 5B depicts a more detailed embodiment of multi-chip module test processing, in accordance with one or more aspects of the present invention. As noted, this processing can be implemented as program code executing on one or more computing resources of the test system, or accessed by the test system. As illustrated in FIG. 5B, the testing includes functionality testing 520 to ensure proper operation of the individual chips of the multi-chip module. This functionality testing includes determining operating voltages of the chips of the multi-chip module 522, and measuring or ascertaining chip currents during an applied test workload. For instance, in one or more embodiments, a specific test workload is applied to the chips and the voltage rails are monitored, which facilitates ascertaining the different current measurements during processing of the workload. These currents include an AC component 526, such as an active or switching current, and a DC component 528, such as a leakage or DC current. Further, one or more chip temperatures 530 are measured using, for instance, thermal diodes and/or digital thermal sensors within the chips themselves. In one implementation, the measurements can be combined, such as averaged, across the chip to determine an operating temperature for the chip. From the determined chip voltages and currents, power is determined 532 by the testing system. This power determination is, in one embodiment, per chip of the multi-chip module and is the power used by each chip in processing, in one embodiment, the applied test workload.

Conventionally, test processing decides whether to pass or fail the multi-chip module from such determinations 544. However, in accordance with one or more aspects disclosed herein, the test processing further determines a thermal resistance for each chip 540 of the multi-chip module, and uses the thermal resistance to determine a thermal control point ($T_{Control}$) for each chip 542. The testing then determines whether there will be a pass or fail of the multi-chip module based on the ascertained range of thermal control points for the chips of the multi-chip module. Advantageously, the thermal control points for the chips are allowed herein to be different across two or more chips of the multi-chip module. For instance, one or more chips of the multi-chip module can have higher thermal control points and/or higher frequency requirements to process the test workload than other chips. The test processing determines whether, taken together, the thermal control points determined for the chips of the multi-chip module allow the chip to be passed. For instance, where a reference temperature of 85° C. is conventionally required as the control point within each chip of a multi-chip module, one chip of the multi-chip module could be allowed to operate at, for instance, 90° C., where the thermal control point of another chip of the module is determined to be at, for instance, 80° C. As the result of passing a multi-chip module, the predetermined thermal control points for the chips of the multi-chip module are saved 546 for use by the thermal control in the operating environment of the system containing the multi-chip module. In one embodiment, the predetermined thermal control points can be saved for the operating environment.

Figure 6A:
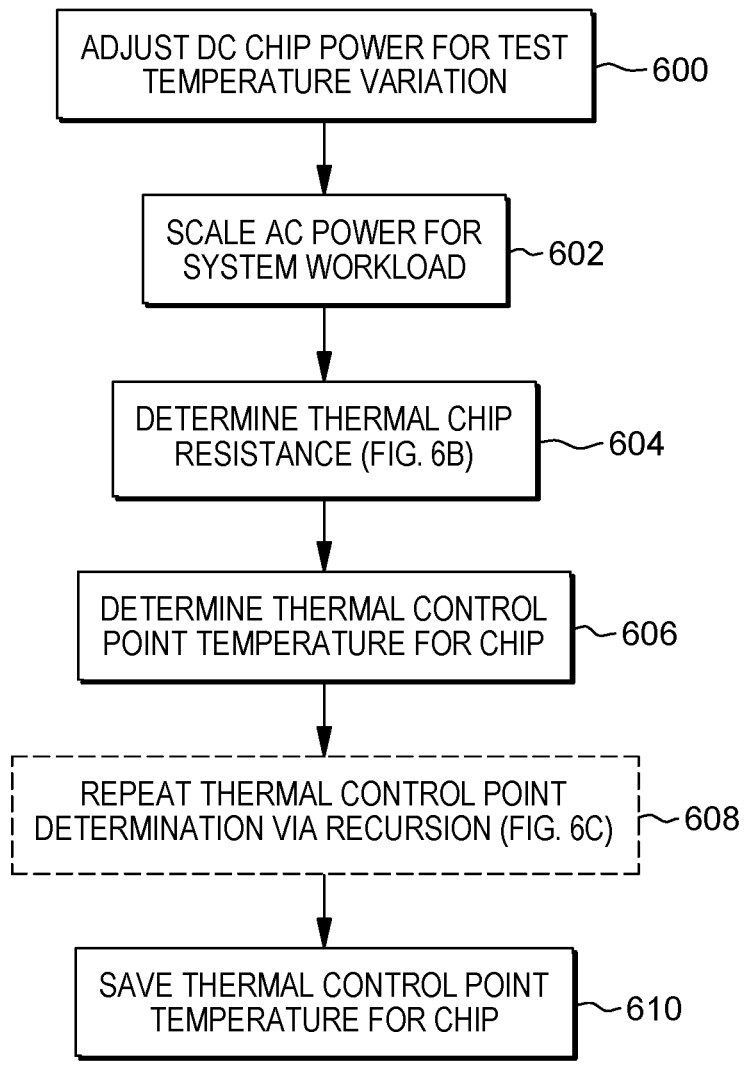
FIG. 6A depicts one embodiment of a process for determining a thermal control point temperature for a chip of a multi-chip module, in accordance with one or more aspects of the present invention.

FIG. 6A depicts one embodiment of processing for determining a thermal control point temperature for a chip of a multi-chip module during testing, in accordance with one or more aspects of the present invention. As noted, this processing can be implemented by program code executing on one or more computing resources, such as described above.

As shown in FIG. 6A, program code adjusts DC power for test temperature variations 600. This is to achieve, for instance, a common reference temperature. The DC chip power being adjusted or corrected is the power measured during the test operation. By way of example, determining thermal control points for a system environment from test environment data can include determining corrected chip DC power ($P_{DC,Corrected}$) as:

$$P_{DC,Corrected} = P_{DC,Test} * DCTempCorrectedFunction(T_{Test}, T_{Reference})$$

where:

$P_{DC,Test}$=chip DC power at test workload;
DCTempCorrectedFunction=leakage correction function for the multi-chip module;
$T_{Test}$=chip test temperature (° C.)
$T_{Reference}$=design reference cooling temperature for chip (° C.):

For instance, in the case where the test system determines a chip uses 90 watts power at 100° C. in the test environment, this information might be corrected to the operating environment as, for instance, 75 watts at 85° C.

The adjusted DC power is then added to scale AC power for anticipated system workload 602. Since the test workload can be different than the system workload, the AC power is scaled to match, for instance, the anticipated operating system use case Scaling the AC power for the system workload can include determining the chip power within the system ($P_{System}$) as:

$$P_{System} = P_{AC,Test} * \frac{Workload_{System}}{Workload_{Test}} + P_{DC,Corrected}$$

where:

$P_{AC,Test}$=chip AC power at test workload (W);
$Workload_{System}$=system AC workload (%);
$Workload_{Test}$=test AC workload (%); and
$P_{DC,Corrected}$=chip DC power at constant temperature (W)

For instance, the chip power within the system $P_{System}$ can be determined to be 211 watts in the above example, which results from 160 W($P_{AC,Test}$)*85%/100%+75 W, in one example.

Figure 6B:
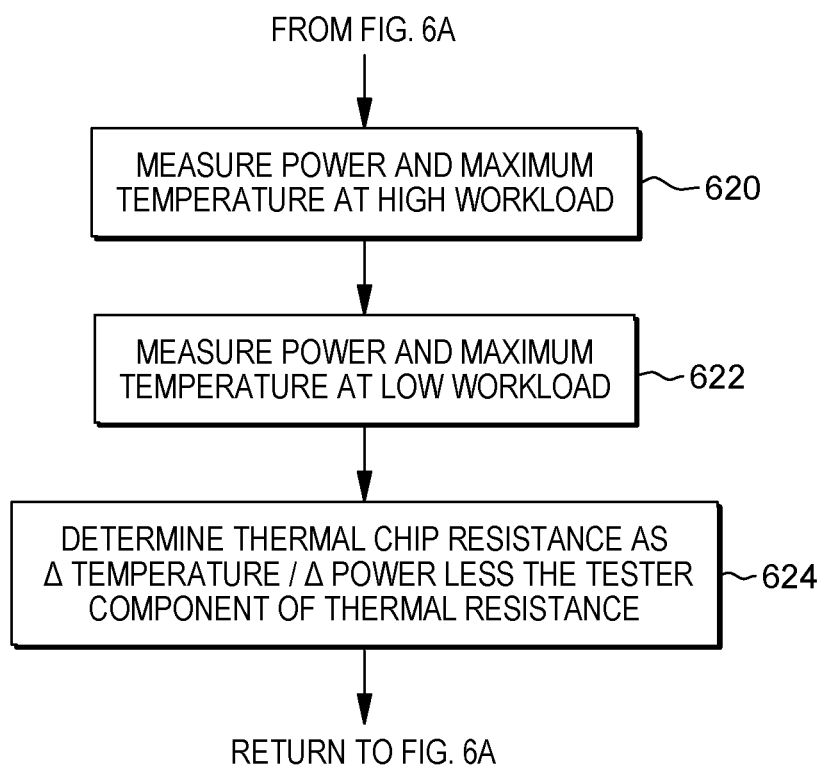
FIG. 6B depicts one embodiment of a process for determining thermal chip resistance to facilitate determining a thermal control point temperature for the chip, for instance, pursuant to the process of FIG. 6A, in accordance with one or more aspects of the present invention.
Figure 6C:
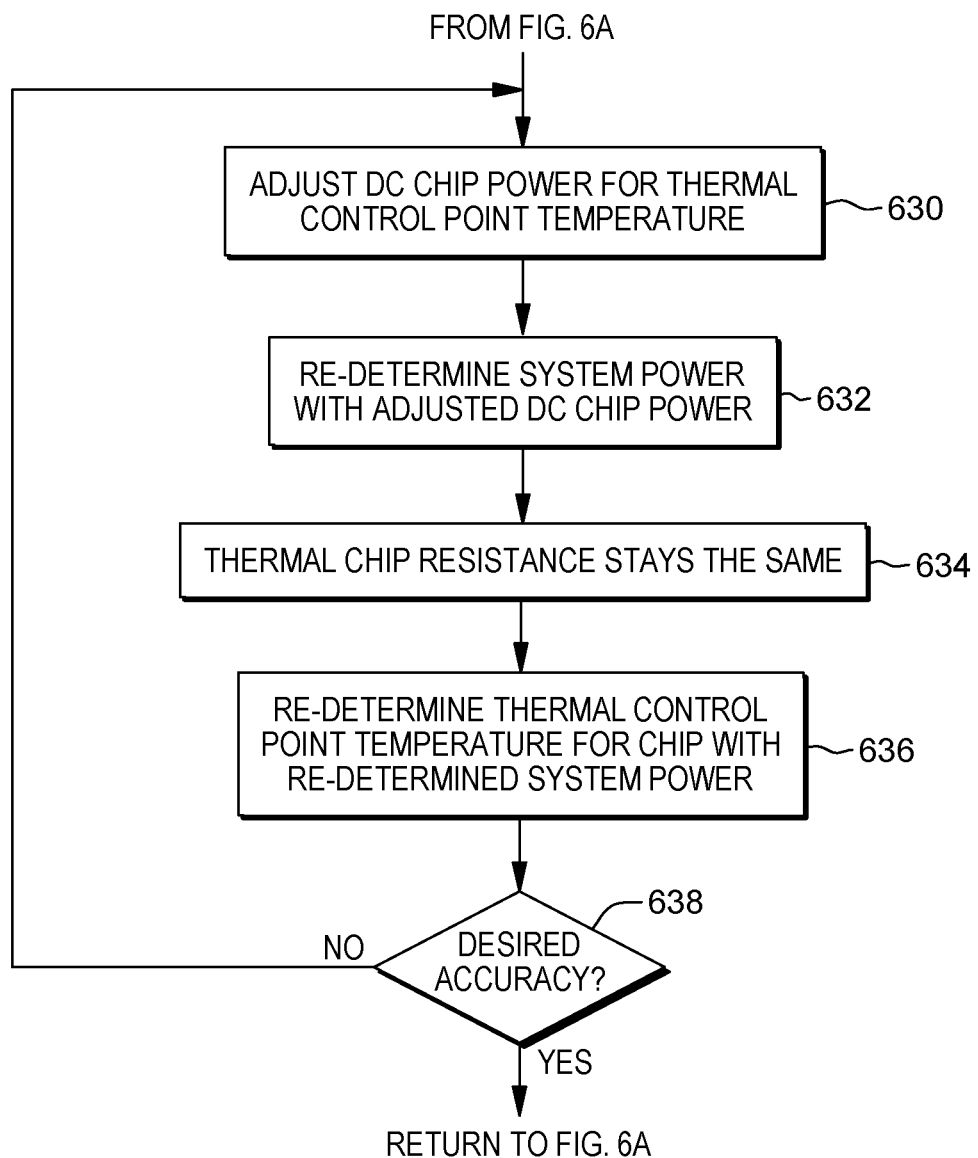
FIG. 6C depicts one embodiment of a recursive process for determining a thermal control point temperature of a chip to a desired accuracy, in accordance with one or more aspects of the present invention.

In accordance with one or more aspects disclosed herein, the program code determines a thermal resistance for a chip of the multi-chip module 604 (such as shown in FIG. 6B), and based thereon, determines a thermal control point temperature for the chip 606. Optionally, the thermal control point determination can be repeated by a recursion, as illustrated in FIG. 6C 608. The resultant thermal control point temperature for the chip is saved 610 for, for instance, subsequent access by a thermal control of the computer system containing the multi-chip module. Note that the testing processing of FIG. 6A is repeated for each chip of multiple chips of the multi-chip module.

FIG. 6B depicts one embodiment of program code processing for determining a thermal chip resistance such as discussed herein. In this embodiment, program code executing on one or more computing resources ascertains a measurement of power and maximum temperature at a high test workload 620 to obtain a high-power value and high-temperature value for the chip. The program code then ascertains a measured power and a maximum chip temperature at a low test workload 622, to provide a low-power and low-temperature value for the chip. From this information, the thermal chip resistance can be determined as the difference in temperature divided by the difference in power, less the tester component of the thermal resistance, where the tester component is the thermal resistance of the test environment without the multi-chip module or chips. In particular, the thermal resistance of a chip can be determined as:

$$R_{Chip} = \left(\frac{\Delta Temperature}{\Delta Power}\right) - R_{Test} \quad (1)$$

where:

$R_{Chip}$=chip thermal resistance (° C./W); and
$R_{Test}$=tester component of thermal resistance (° C./W).

From this, the total thermal resistance can be determined as:

$$R_{Total} = R_{Module} + R_{System}$$

where:

$R_{Total}$=total thermal resistance (° C./W);
$R_{Module}$=module component of the thermal resistance (° C./W), which is a summation of the $R_{Chip}$ thermal resistance values; and
$R_{System}$=system component of thermal resistance (° C./W).

Note that the system component of the thermal resistance is based on the individual system cooling solution and configuration that the multi-chip module is operating within. $R_{System}$ is the thermal resistance above, for instance, the multi-chip module lid, including any heat sink, thermal interface material, and known airflow/waterflow cooling to the multi-chip module.

For instance, using the above example, a total thermal resistance ($R_{Total}$) can be determined as 0.2° C./W= 0.1° C./W (for $R_{Module}$)+0.1° C./W (for $R_{System}$), in one example.

With the above information, program code then determines a respective thermal control point for a chip of the multi-chip module as:

$$T_{Control} = T_{Reference} + R_{Total}(P_{System} - P_{Reference})$$

where:

$T_{Control}$=chip thermal control point (° C.);
$T_{Reference}$=design reference cooling temperature for the chip (° C.);
$R_{Total}$=total thermal resistance (° C./W);
$P_{System}$=chip power within the system at constant temperature and workload (W); and
$P_{Reference}$=reference chip power (W).

Using the example numbers described above, this results in a thermal control point of 87.2° C., determined as 85° C.+0.2° C./W*(211 W−200 W), in one example only.

FIG. 6C depicts an optional embodiment of program code processing for attaining a more accurate thermal control point using recursion. In this process, the DC chip power is again adjusted for the thermal control point temperature 630 which is, in the first pass through, a nominal design point temperature (for instance, 85° C. in the example provided above). Program code redetermines the system power with the adjusted DC power 632. The thermal chip resistance stays the same 636, for instance, as determined above in connection with the processing of FIG. 6A, and the thermal control point temperature for the chip is redetermined with the redetermined system power 636. Program code determines whether the desired accuracy has been achieved 638, and if not, repeats the process. With the next pass through, the redetermined thermal control point temperature is used in place of the prior thermal control point temperature as the temperature used to adjust DC power 630, such as the nominal design point temperature at the start of the process.

Figure 7:
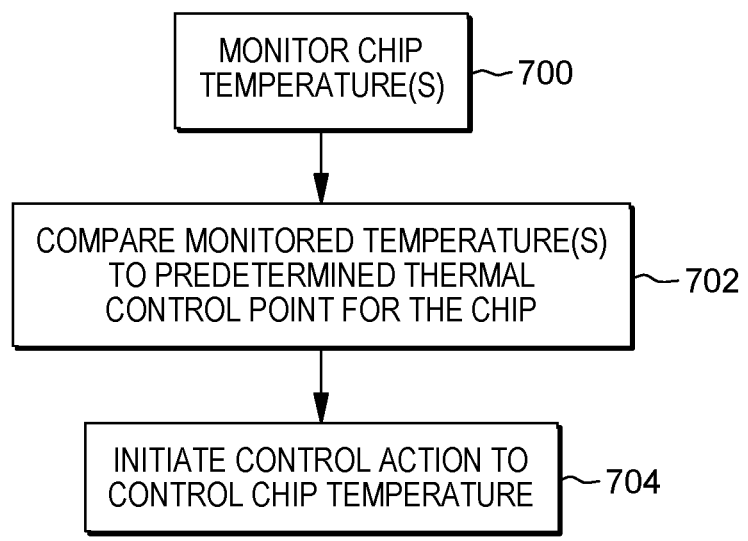
FIG. 7 depicts one embodiment of a thermal control process for controlling operating temperature of a chip of a multi-chip module, in accordance with one or more aspects of the present invention.

FIG. 7 depicts one embodiment of an operational thermal control process for controlling temperature of an individual chip of a multi-chip module, in accordance with one or more aspects of the present invention. In one embodiment, this program code processing is implemented by a thermal control, such as the thermal control described above in connection with FIG. 1B. One or more chip temperatures are monitored 700 in order to ascertain an operating chip temperature, and this operating chip temperature is then compared directly or indirectly to the predetermined thermal control point for the chip 702. As noted, this comparison can include comparing the operating chip temperature to one or more chip temperature thresholds ascertained with reference to the predetermined thermal control point for the chip. Depending on the control process, a control action can be initiated by the thermal control to control chip temperature 704. For instance, where the monitored operating temperature of the chip is within a set percentage or set temperature of the predetermined thermal control point, cooling to the multi-chip module, and hence cooling to the chip, can be increased to facilitate maintaining operating temperature of the chip at or below the predetermined thermal control point.

Those skilled in the art will note from the above description that provided herein are computer-implemented methods, computer systems and computer program products, where program code executing on one or more processors predetermines separate thermal control points for multiple chips of a multi-chip module, with two or more chips of the multi-chip module having different predetermined thermal control points. These predetermined thermal control points are separate thermal control points for the chips, such that a range of predetermined thermal control points for the chips of a multi-chip module is ascertained, disposed for instance about a design point temperature for the chips. These predetermined thermal control points are static control points that are then used by, for instance, the thermal control, to direct taking a control action, such as taking a cooling action to increase cooling of the multichip module in the operating environment or, if necessary, initiate a performance throttling action. The separate thermal control points advantageously allow different power and frequency chip operation across the multi-chip module, even where the chips have an identical design. Thus, a chip can have a higher acceptable power and frequency operation, and thus, temperature operation, where one or more other chips of the multi-chip module are ascertained to operate or require a lower power and temperature for processing the same or similar workload.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
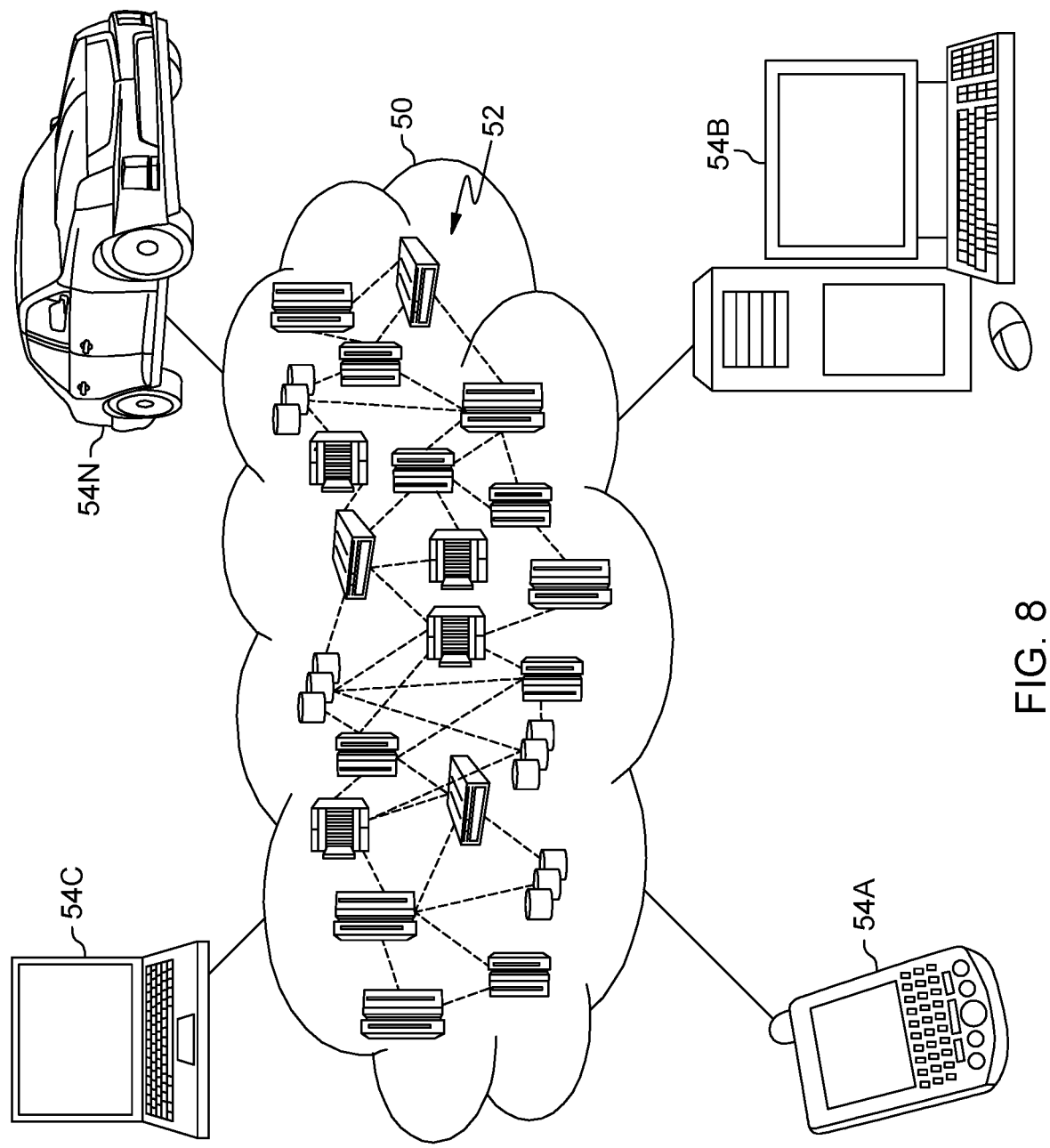
FIG. 8 depicts an embodiment of a cloud computing environment which can implement, or be used in association with, certain aspects of an embodiment of the present invention.

A cloud computing node can include a computer system/server, such as the one depicted in FIG. 8. Computer system/server 102 of FIG. 1A can be practiced in distributed cloud computing environments where tasks are performed by remote processing devices that are linked through a communications network. In a distributed cloud computing environment, program modules may be located in both local and remote computer system storage media including memory storage devices. Computer system/server 102 is capable of being implemented and/or performing any of the functionality set forth hereinabove.

Referring now to FIG. 8, illustrative cloud computing environment 50 is depicted. As shown, cloud computing environment 50 can comprise one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 52 and cloud computing environment 50 can communicate with any type of computerized device over any type of network and/or network addressable connection (e.g., using a web browser).

Figure 9:
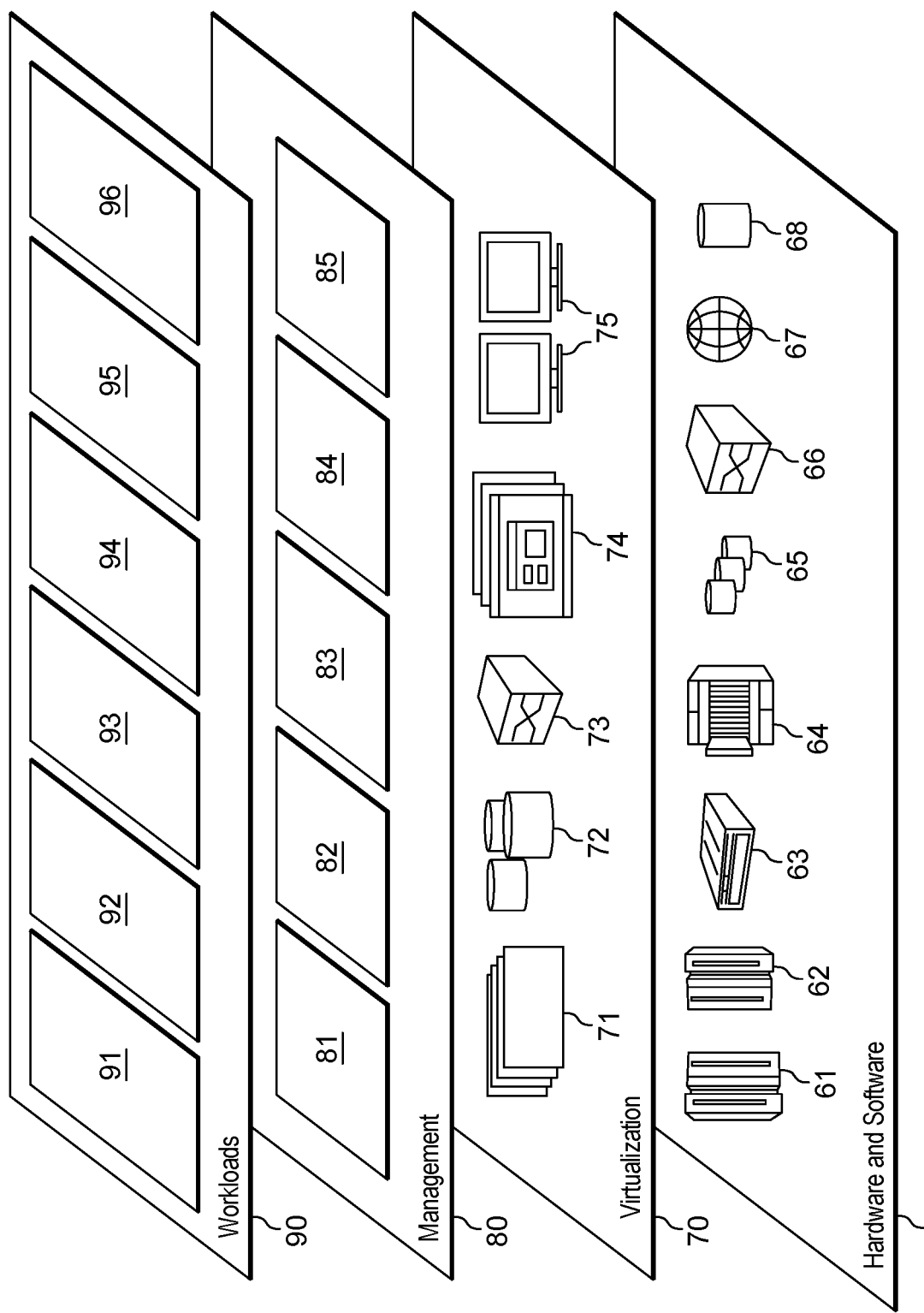
FIG. 9 depicts abstraction model layers according to an embodiment of the present invention.

Referring to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and separate thermal control point processing 96 of chips of a multi-chip module.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local-area network, a wide-area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local-area network (LAN) or a wide-area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer-implemented method comprising:
predetermining separate thermal control points for multiple chips of a multi-chip module, wherein a first chip and a second chip of the multiple chips have different predetermined thermal control points, and the predetermining separate thermal control points includes determining thermal resistance (C°/W) of the multi-chip module ($R_{module}$), the thermal resistance of the multi-chip module ($R_{module}$) being used in ascertaining the separate thermal control points for the multiple chips of the multi-chip module; and saving the predetermined separate thermal control points for reference by a thermal control of the multi-chip module in an operating environment, the thermal control to:
monitor an operating temperature of the first chip of the multiple chips;
compare the operating temperature of the first chip to the predetermined separate thermal control point of the first chip; and
initiate a control action to control temperature of the first chip based on comparing the operating temperature of the first chip to the predetermined separate thermal control point of the first chip.

2. The computer-implemented method of claim 1, wherein the predetermining separate thermal control points is performed during a testing phase of the multi-chip module, and the thermal control references the saved predetermined separate thermal control points during an operating phase of the multi-chip module in the operating environment.

3. The computer-implemented method of claim 1, wherein the predetermining separate thermal control points uses testing environment data for the multiple chips of the multi-chip module in determining the predetermined separate thermal control points for the multiple chips for the operating environment.

4. The computer-implemented method of claim 1, wherein the predetermining separate thermal control points is based, in part, on power used by each chip of the multiple chips during testing of the multi-chip module, wherein power used by the first chip and the second chip during testing of the multi-chip module is different.

5. The computer-implemented method of claim 1, wherein the predetermining separate thermal control points includes determining a total thermal resistance ($R_{Total}$) which includes the thermal resistance of the multi-chip module ($R_{Module}$) and thermal resistance of a system ($R_{System}$) to comprise the multi-chip module, the total thermal resistance being used in ascertaining the separate thermal control points for the multiple chips of the multi-chip module.

6. The computer-implemented method of claim 5, wherein the predetermining separate thermal control points comprises determining a respective thermal control point for a chip of the multiple chips as:

$$T_{Control} = T_{Reference} + R_{Total}(P_{System} - P_{Reference})$$

wherein:
$T_{Control}$=chip thermal control point (° C.);
$T_{Reference}$=design reference cooling temperature for the chip (° C.);
$R_{Total}$=total thermal resistance (° C./W);
$P_{System}$=chip power within the system at constant temperature and workload (W); and
$P_{Reference}$=reference chip power (W).

7. The computer-implemented method of claim 6, wherein the predetermining separate thermal control points comprises determining the chip power within the system $P_{System}$ as:

$$P_{System} = P_{AC,Test} * \frac{Workload_{System}}{Workload_{Test}} + P_{DC,Corrected}$$

wherein:
$P_{AC,Test}$=chip AC power at test workload (W);
Workload$_{System}$=system AC workload (%);
Workload$_{Test}$=test AC workload (%); and
$P_{DC,Corrected}$=chip DC power at constant temperature (W).

8. The computer-implemented method of claim 7, wherein the predetermining separate thermal control points comprises determining the chip DC power $P_{DC,Corrected}$ as:

$$P_{DC,Corrected}=P_{DC,Test}*\text{DCTempCorrectedFunction}(T_{Test}, T_{Reference})$$

wherein:
$P_{DC,Test}$=chip DC power at test workload;
DCTempCorrectedFunction=leakage correction function for the multi-chip module;
$T_{Test}$=chip test temperature (° C.)
$T_{Reference}$=design reference cooling temperature for chip (° C.).

9. The computer-implemented method of claim 1, wherein the first chip and the second chip have an identical chip design.

10. The computer-implemented method of claim 1, wherein the predetermining separate thermal control points comprises determining a different thermal control point for each chip of the multiple chips of the multi-chip module.

11. A system comprising:
a memory;
one or more processors in communication with the memory; and
program instructions executable by the one or more processors via the memory to perform a method, the method comprising:
predetermining separate thermal control points for multiple chips of a multi-chip module, wherein a first chip and a second chip of the multiple chips have different predetermined thermal control points, and the predetermining separate thermal control points includes determining thermal resistance (C°/W) of the multi-chip module ($R_{Module}$) the thermal resistance of the multi-chip module ($R_{Module}$) being used in ascertaining the separate thermal control points for the multiple chips of the multi-chip module; and
saving the predetermined separate thermal control points for reference by the thermal control of the multi-chip module in an operating environment, the thermal control to:
monitor an operating temperature of the first chip of the multiple chips;
compare the operating temperature of the first chip to the predetermined separate thermal control point of the first chip; and
initiate a control action to control temperature of the first chip based on comparing the operating temperature of the first chip to the predetermined separate thermal control point of the first chip.

12. The system of claim 11, wherein the predetermining separate thermal control points is performed during a testing phase of the multi-chip module, and the thermal control references the saved predetermined separate thermal control points during an operating phase of the multi-chip module in the operating environment.

13. The system of claim 11, wherein the predetermining separate thermal control points uses testing environment data for the multiple chips of the multi-chip module in determining the predetermined separate thermal control points for the multiple chips for the operating environment.

14. The system of claim 11, wherein the predetermining separate thermal control points is based, in part, on power used by each chip of the multiple chips during testing of the multi-chip module, wherein power used by the first chip and the second chip during testing of the multi-chip module is different.

15. The system of claim 11, wherein the predetermining separate thermal control points includes determining a total thermal resistance ($R_{Total}$) which includes the thermal resistance of the multi-chip module ($R_{Module}$) and thermal resistance of a system ($R_{System}$) to comprise the multi-chip module, the total thermal resistance being used in ascertaining the separate thermal control points for the multiple chips of the multi-chip module.

16. The system of claim 15, wherein the predetermining separate thermal control points comprises determining a respective thermal control point for a chip of the multiple chips as:

$$T_{Control}=T_{Reference}+R_{Total}(P_{System}-P_{Reference})$$

wherein:
$T_{Control}$=chip thermal control point (° C.);
$T_{Reference}$=design reference cooling temperature for the chip (° C.);
$R_{Total}$=total thermal resistance (° C./W);
$P_{System}$=chip power within the system at constant temperature and workload (W); and
$P_{Reference}$=reference chip power (W).

17. The system of claim 11, wherein the first chip and the second chip have an identical chip design.

18. A computer program product comprising:
a computer-readable storage medium having program instructions embodied therewith, the program instructions being executable by one or more processors to cause the one or more processors to:
predetermine separate thermal control points for multiple chips of a multi-chip module, wherein a first chip and a second chip of the multiple chips have different predetermined thermal control points, and the predetermine separate thermal control points includes determining thermal resistance (C°/W) of the multi-chip module ($R_{Module}$), the thermal resistance of the multi-chip module ($R_{Module}$) being used in ascertaining the predetermined separate thermal control points for the multiple chips of the multi-chip module; and
save the predetermined separate thermal control points for reference by the thermal control of the multi-chip mode in an operating environment, the thermal control to:
monitor an operating temperature of the first chip of the multiple chips;
compare the operating temperature of the first chip to the predetermined separate thermal control point of the first chip; and
initiate a control action to control temperature of the first chip based on comparing the operating temperature of the first chip to the predetermined separate thermal control point of the first chip.

19. The computer program product of claim 18, wherein the predetermining separate thermal control points is performed during a testing phase of the multi-chip module, and the thermal control references the saved predetermined separate thermal control points during an operating phase of the multi-chip module in the operating environment.

20. The computer program product of claim 18, wherein the first chip and the second chip have an identical chip design.

* * * * *